United States Patent
Takahashi et al.

(10) Patent No.: US 6,801,708 B1
(45) Date of Patent: Oct. 5, 2004

(54) DATA RECORDING AND REPRODUCING APPARATUS AND DATA DISPLAYING METHOD

(75) Inventors: Kashu Takahashi, Kanagawa (JP); Shinichi Morishima, Kanagawa (JP); Makoto Tabuchi, Kanagawa (JP); Kazuo Kamiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/550,088

(22) Filed: Apr. 14, 2000

(30) Foreign Application Priority Data

Apr. 16, 1999 (JP) .......................................... 11-109397

(51) Int. Cl.⁷ ................................................. H04N 5/93
(52) U.S. Cl. ........................... 386/52; 386/55; 345/723; 725/37
(58) Field of Search ....................... 725/37, 43; 386/52, 386/55; 345/723; H04N 5/93

(56) References Cited

U.S. PATENT DOCUMENTS

| | | | |
|---|---|---|---|
| 4,322,814 A | * 3/1982 | Menezes et al. | ............... 714/48 |
| 5,467,288 A | 11/1995 | Fasciano et al. | |
| 6,052,508 A | * 4/2000 | Mincy et al. | .................. 386/52 |

OTHER PUBLICATIONS

TV Cameramen: "Panasonic Announces Pricing Availability on New AJ–LT95 DVCPR050 4:2:2 Laptop Editing System" Product Description, 'Online!—1998 XP002264930 Retrieved from the Internet:<URL: http://WWW.tvcameramen.com/newsroom/equipnews01.htm> 'retrieved on Dec. 11, 2003!.

* cited by examiner

Primary Examiner—Vincent Boccio
(74) Attorney, Agent, or Firm—Frommer Lawrence & Haug LLP; William S. Frommer; Darren M. Simon

(57) ABSTRACT

A data recording and reproducing apparatus having a recording and reproducing means for recording and reproducing data containing video data and/or audio data to and from a record medium that is non-linearly accessible and a plurality of input and output processing means for accessing the recording and reproducing means in respectively assigned time slot periods, outputting the data that is output from the outside to the recording and reproducing means, and inputting the data from the recording and reproducing means is disclosed, that comprises an operating means for performing at least a record operation for causing the data to be recorded to the record medium and a reproduction operation for causing the data to be reproduced from the record medium, and a displaying means for displaying the data that is input to and that is output from the plurality of input and output means, wherein the operating means and the displaying means are integrally structured.

14 Claims, 12 Drawing Sheets

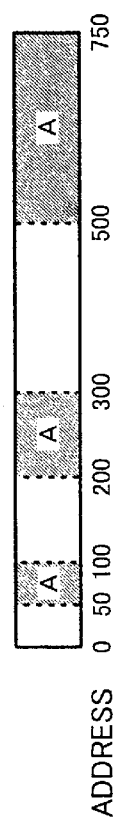
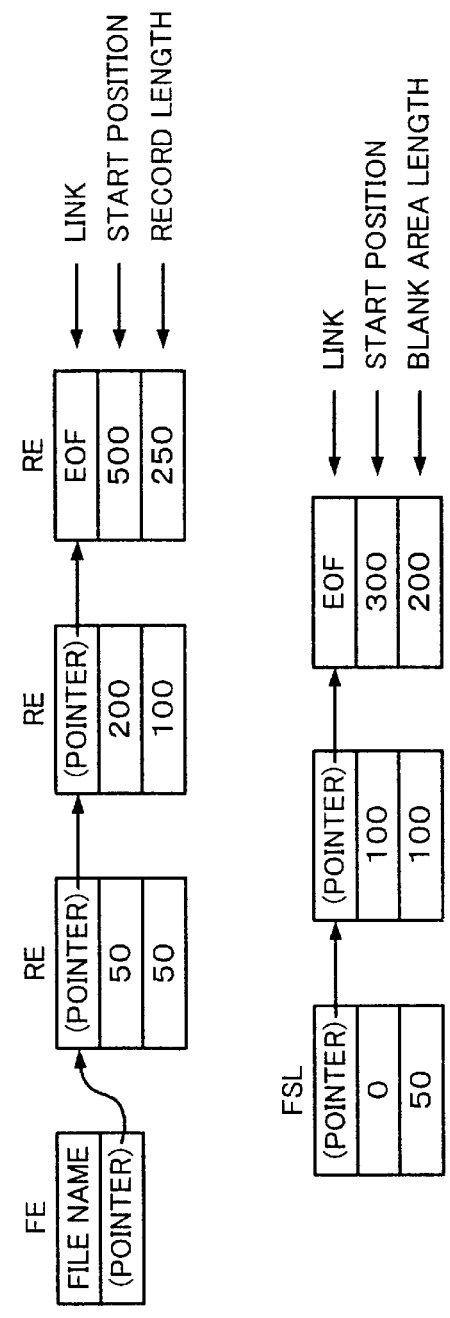
Fig. 6A
Fig. 6B
Fig. 6C

| FILE NAME | REPRODUCTION START POSITION | REPRODUCTION END POSITION |
|---|---|---|

| FILE NAME | REPRODUCTION START POSITION | REPRODUCTION END POSITION |
|---|---|---|
| A | 10 | 60 |

| FILE NAME | REPRODUCTION START POSITION | REPRODUCTION END POSITION |
|---|---|---|
| A' | 10 | 50 |

Fig. 14

| | | | | | | |
|---|---|---|---|---|---|---|
| Number | P1 | NewJersey*Indiana<br>Shuttle +16 | | TCR Remain 02H15M / 50<br>VITC  00:14:37:29<br>NDF | | |
| Name | | Monitor | Miami*Houston | | | |
| Update | | | No: 0004 | | | |
| Length | | | Length: 01:35:08:17<br>Updae: 07/23/98 11:00 | | | |
| | | No: | Name | | Update | |
| | | 0001 | Chicago*Orland | | 10/14/98 11:40 | |
| | | 0002 | Boston*Portland | | 07/23/98 10:51 | |
| | | 0003 | Newyork*Indiana | | 09/07/98 11:03 | |
| | | 0004 | Miami*Houston | | 07/23/98 11:00 | |
| | | 0005 | NewJersey*Indiana | | 07/22/98 11:59 | |
| | | 0008 | Orland*Miami | | 07/13/98 10:47 | |
| | | 0011 | Portland*NewYork | | 06/04/98 10:28 | |
| | | 0012 | Indiana*Boston | | 05/11/98 11:46 | |
| | | 0014 | NewJersey*Portland | | 07/23/98 11:37 | |
| | | | Go To Top | Go To End | | Select Active |

DATA RECORDING AND REPRODUCING APPARATUS AND DATA DISPLAYING METHOD

BACKGROUND OF THE INVENTION

1. Field of the Invention

The present invention relates to a data recording and reproducing apparatus and a data displaying method for storing audio data and/or video data to a record medium that is non-linearly accessible, for displaying input video data, and/or for reproducing and displaying stored video data.

2. Description of the Related Art

In recent television broadcasts, digital video and audio signals are becoming common. These television broadcasts are referred to as digital broadcasts. In the digital broadcasts, many information channels can be used. Thus, there are strong needs for recording and/or reproducing a plurality of channels of video data and/or audio data (hereinafter referred to as A/V data) with one A/V data recording and reproducing apparatus so that a plurality of channels of A/V data are recorded and reproduced in parallel and that while a particular channel of A/V data is recorded, another channel of A/V data is reproduced. To satisfy such needs, an apparatus that records A/V data with a random-accessible record medium (such as a hard disk) is becoming common (hereinafter such an apparatus is referred to as A/V (Audio and/or Video) server).

The A/V server has a plurality of inputs channels and output channels of A/V data. In addition, the A/V server is controlled by an external controller such as a dedicated editing device or a personal computer. The operator can observe A/V data stored in the A/V server and A/V data that is input to an input portion with a monitor connected to the A/V server using the controlling unit and the personal computer.

With the controller connected as an external unit to the A/V server, input A/V data is recorded to a record medium and A/V data stored in a record medium is edited. In the editing operation, the operator designates a desired IN point and a desired OUT point with the controller while observing a reproduced picture that is read and reproduced from the record medium. First, the operator coarsely designates an IN point and an OUT point with the controller. Thereafter, the operator causes the A/V server to reproduce the picture frame by frame and decides an exact IN point and an exact OUT point. A/V data from the designated IN point to the OUT point is output to the outside of the A/V server. The edited result may be stored as new A/V data to a record medium.

Conventionally, as described above, the monitor and the controller are separately disposed. Thus, when performing the editing operation, the operator who performs the editing operation should frequently turn his/her eyes between the monitor and the controller. Consequently, the editing operation is troublesome.

In addition, the A/V server may be used outdoors for example sports live broadcasts. In this case, the A/V server, the monitor, and the controller should be disposed in a limited space of a mobile broadcasting vehicle.

In addition to the A/V server, the monitor should be carried. In this case, the portability is low.

OBJECTS AND SUMMARY OF THE INVENTION

Thus, an object of the present invention is provide a data recording and reproducing apparatus and a data displaying method that allow A/V data stored in a record medium to be suitably displayed for an editing operation.

Another object of the present invention is to provide a data recording and reproducing apparatus and a picture displaying method that allow A/V data stored in a record medium to be displayed in a limited space.

A first aspect of the present invention is a data recording and reproducing apparatus having a recording and reproducing means for recording and reproducing data containing video data and/or audio data to and from a record medium that is non-linearly accessible and a plurality of input and output processing means for accessing the recording and reproducing means in respectively assigned time slot periods, outputting the data that is output from the outside to the recording and reproducing means, and inputting the data from the recording and reproducing means, the apparatus comprising an operating means for performing at least a record operation for causing the data to be recorded to the record medium and a reproduction operation for causing the data to be reproduced from the record medium, and a displaying means for displaying the data that is input to and that is output from the plurality of input and output means, wherein the operating means and the displaying means are integrally structured.

A second aspect of the present invention is a data recording and reproducing apparatus having a recording and reproducing means for recording and reproducing data containing video data and/or audio data to and from a record medium that is non-linearly accessible and a plurality of input and output processing means for accessing the recording and reproducing means in respectively assigned time slot periods, outputting the data that is output from the outside to the recording and reproducing means, and inputting the data from the recording and reproducing means, the apparatus comprising an operating means for performing at least a record operation for causing the data to be recorded to the record medium and a reproduction operation for causing the data to be reproduced from the record medium, a data storing means for temporarily storing the data recorded in the record medium, and a displaying means for displaying the data stored in the data storing means, wherein the operating means and the displaying means are integrally structured.

A third aspect of the present invention is a data recording and reproducing apparatus having a recording and reproducing means for recording and reproducing data containing video data and/or audio data to and from a record medium that is non-linearly accessible and a plurality of input and output processing means for accessing the recording and reproducing means in respectively assigned time slot periods, outputting the data that is output from the outside to the recording and reproducing means, and inputting the data from the recording and reproducing means, the apparatus comprising an operating means for performing at least a record operation for causing the data to be recorded to the record medium and a reproduction operation for causing the data to be reproduced from the record medium so as to edit the data, a data storing means for temporarily storing the data recorded in the record medium when the data is edited by a predetermined operation performed by the operating means, and a displaying means for displaying the data stored in the data storing means, wherein the operating means and the displaying means are integrally structured.

A fourth aspect of the present invention is a data displaying method for a data recording and reproducing apparatus for outputting data containing video data and/or audio data that is supplied from the outside to a record medium that is non-linearly accessible in an assigned time slot period and for outputting the data from the record medium in an assigned time slot period, the method comprising the steps of (a) performing at least a record operation for causing the data to be recorded to the record medium and a reproduction operation for causing the data to be reproduced from the record medium corresponding to an operation of an operating means, and (b) displaying the data on a displaying means integrally structured with the operating means corresponding to an operation performed at step (a).

A fifth aspect of the present invention is a data displaying method for a data recording and reproducing apparatus for outputting data containing video data and/or audio data that is supplied from the outside to a record medium that is non-linearly accessible in an assigned time slot period and for outputting the data from the record medium in an assigned time slot period, the method comprising the steps of (a) performing at least a record operation for causing the data to be recorded to the record medium and a reproduction operation for causing the data to be reproduced from the record medium corresponding to an operation of an operating means, (b) temporarily storing the data reproduced from the record medium corresponding to the reproduction operation performed at step (a), and (c) displaying the data temporarily stored at step (b) on a displaying means integrally structured with the operating means.

A sixth aspect of the present invention is a data displaying method for a data recording and reproducing apparatus for outputting data containing video data and/or audio data that is supplied from the outside to a record medium that is non-linearly accessible in an assigned time slot period and for outputting the data from the record medium in an assigned time slot period, the method comprising the steps of (a) performing at least a record operation for causing the data to be recorded to the record medium and a reproduction operation for causing the data to be reproduced from the record medium corresponding to an operation of an operating means so as to edit the data, (b) temporarily storing the data recorded in the record medium when the data is edited by a predetermined operation performed at step (a), and (c) displaying the data temporarily stored at step (b) on a displaying means integrally structured with the operating means.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 6A, 6B, and 6C are schematic diagrams showing a file accessing operation with the record entry information;

FIG. 14 is a schematic diagram showing another example of information displayed on the displaying portion.

DETAILED DESCRIPTION OF THE PREFERRED EMBODIMENTS

Figure 1:
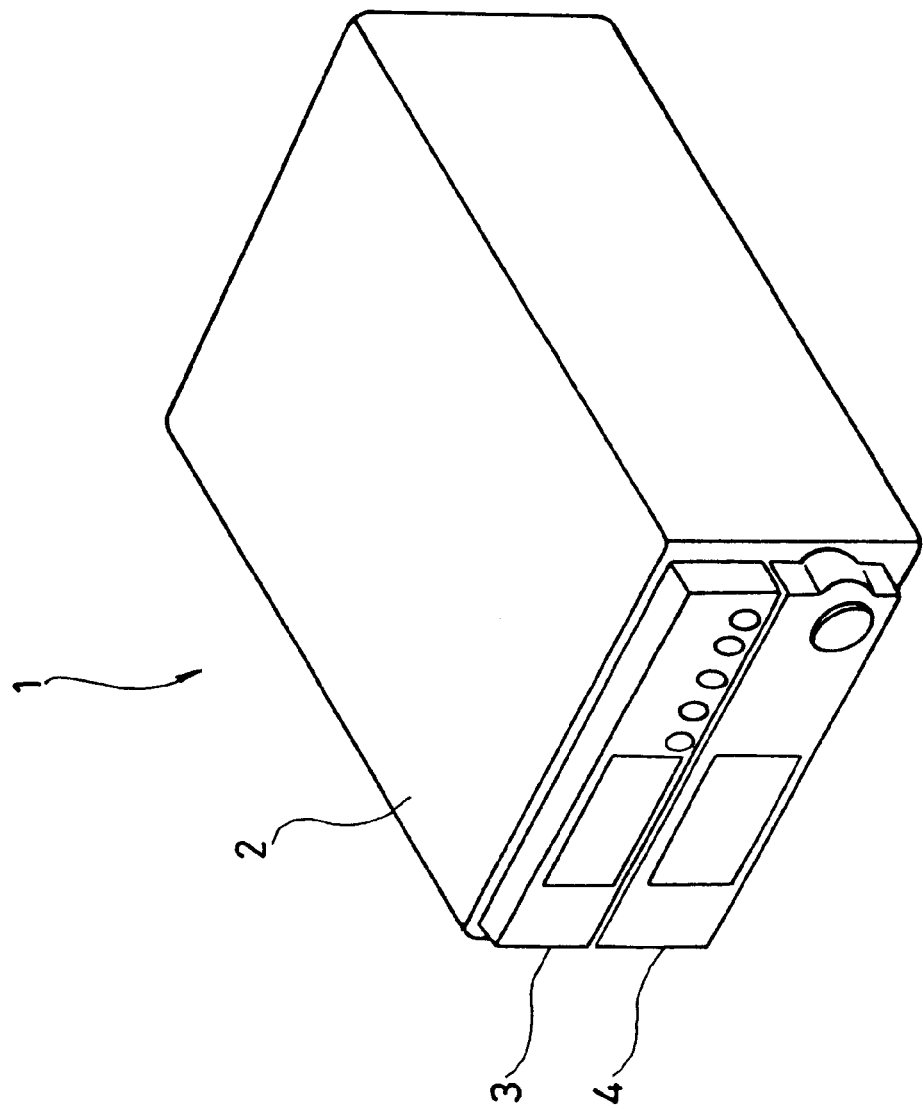
FIG. 1 is a perspective view showing an appearance of a data recording and reproducing apparatus according to an embodiment of the present invention.

FIG. 1 is a perspective view showing an appearance of a data recording and reproducing apparatus according to an embodiment of the present invention. The data recording and reproducing apparatus is an A/V (Audio and/or Video) server that has a plurality of input and output ports and that records and stores audio data and/or video data and reproduces a plurality of channels of stored A/V data in parallel.

The data recording and reproducing apparatus 1 according to the embodiment of the present invention has one housing 2. The size of the housing 2 is almost similar to the size of a conventional VCR. A meter panel 3 is disposed at an upper portion on the front side of the housing 2. A control panel 4 is disposed below the meter panel 3. The control panel 4 is detachable from the housing 2. When the control panel 4 is not used, it can be removed from the housing 2. Alternatively, the control panel 3 can be removed from the housing 2 and used as an independent unit in such a manner that it is connected a relevant circuit of the housing 2 with a cable.

Figure 2:
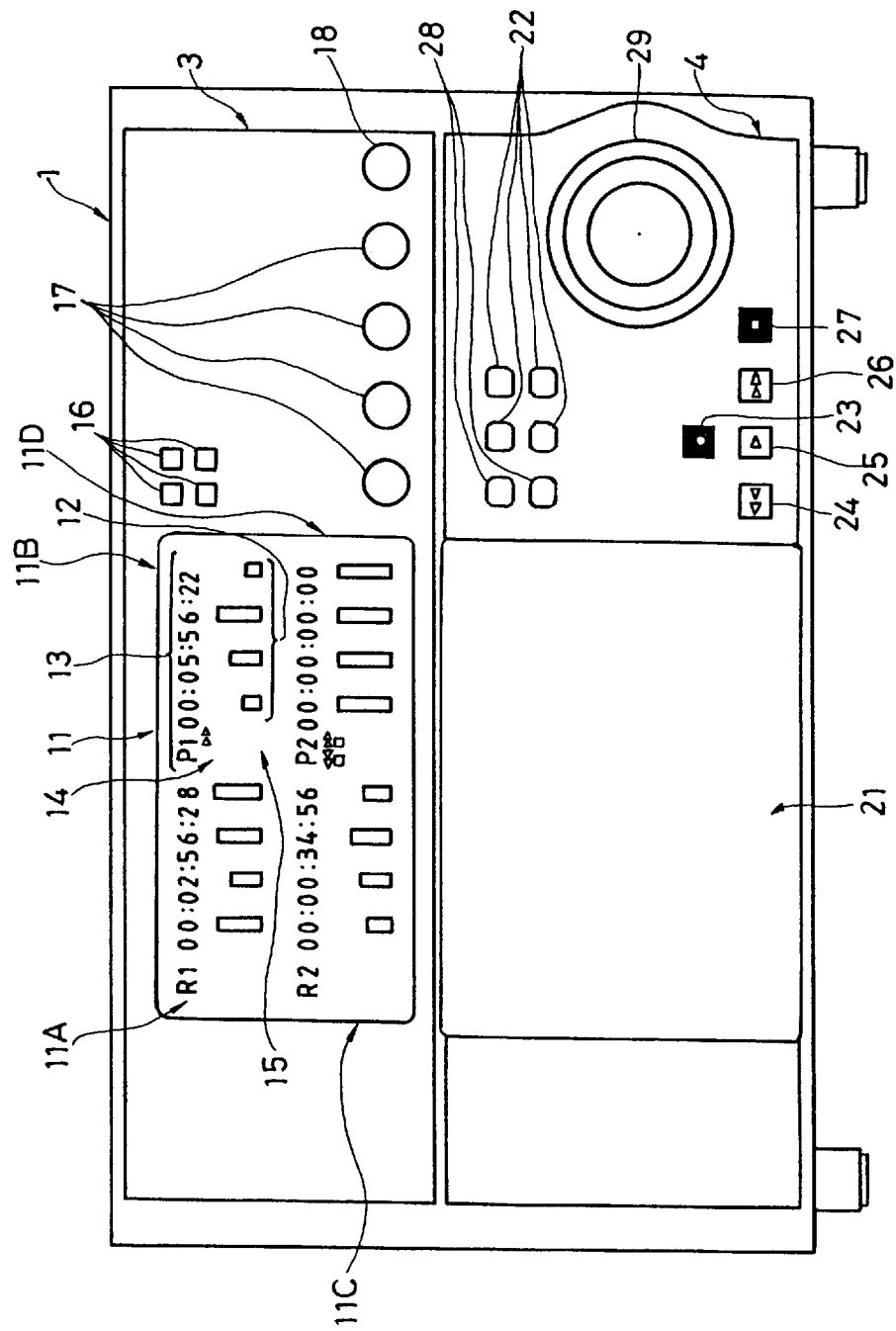
FIG. 2 is a front view showing the structures of principal portions of a meter panel and a control panel of the data recording and reproducing apparatus.

FIG. 2 is a front view showing principal portions of the meter panel 3 and the control panel 4 shown in FIG. 1. The data recording and reproducing apparatus 1 according to the embodiment of the present invention has four ports as an input portion that inputs A/V data and an output portion that outputs A/V data. Each port can input or output video data and four or eight channels of audio data.

The meter panel 3 shown in FIG. 2 has a displaying portion 11. The displaying portion 11 has four display areas 11A, 11B, 11C, and 11D corresponding to the four ports. The display areas 11A, 11B, 11C, and 11D are disposed at an upper left portion, an upper right portion, a lower left portion, and a lower right portion of the displaying portion 11, respectively. Each of the display areas 11A to 11D has an audio level meter portion 12, a dot matrix portion 13, a status displaying portion 14, and an information displaying portion 15. The audio level meter portion 12 displays audio level meters for four channels. The dot matrix portion 1 displays a time code and so forth. The state displaying portion 14 displays the current operation state (reproduction state, recording state, etc.) of each port. The information displaying portion 15 displays various types of information such as the type of a time code type that is currently displayed.

The audio level meter portion 12 displays channel numbers below the audio level meters of the individual channels.

With a particular switch that will be described later, the audio level meter portion 12 selectively shows four audio level meters of the first to fourth channels or the fifth to eighth channels that are input/output to/from each port.

With the data recording and reproducing apparatus 1 according to the embodiment of the present invention, various operations such as an input selecting operation of A/V data, an audio data recording/reproduction level adjusting operation, and an audio channel selecting operation can be performed for each port. The meter panel 3 has four port selection switches that select the four ports for such operations.

The meter panel 3 also has four rotary encoders 17 and a rotary encoder 18. The four rotary encoders 17 adjust the recording/reproducing levels of four channels of audio data. The rotary encoder 18 adjusts a video process.

Figure 3:
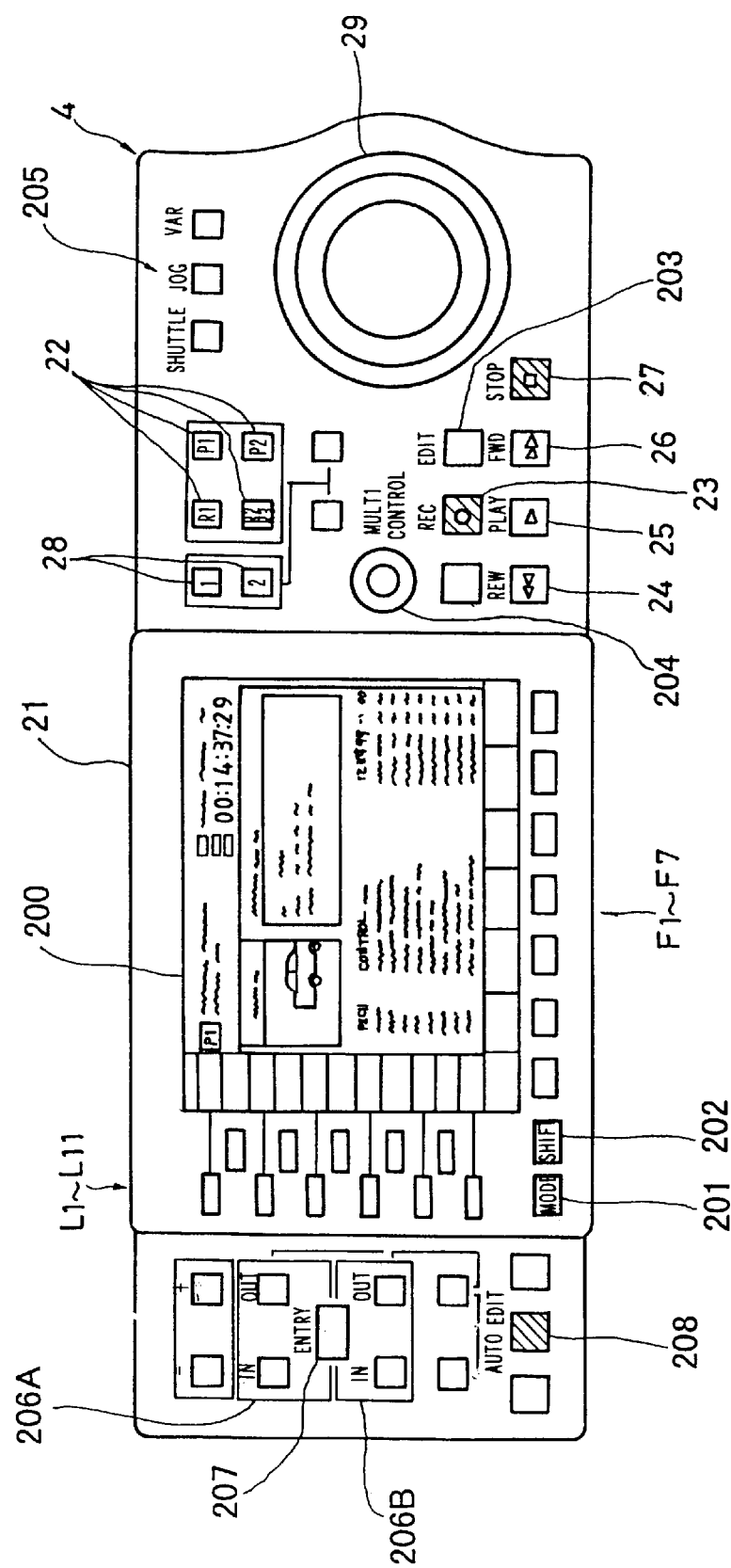
FIG. 3 is a schematic diagram showing the structure of further principal portions of the control panel.

On the other hand, the control panel shown in FIGS. 2 and 3 has various switches and an operating and displaying portion 21. The various switches are used for the editing operation. The operating and displaying portion 21 has a displaying portion 200 that displays a picture and so forth for the editing operation. The displaying portion 200 displays a picture used for the editing operation and a recording picture as a moving picture or a still picture. In addition, the displaying portion 200 displays a list of picture files-and attribute information thereof. Moreover, the displaying portion 200 displays menus at a left edge position and a lower edge position thereof. The menus correspond to a plurality of soft keys L1 to L11 and F1 to F7 disposed in the operating and displaying portion 21. A mode key 201 is used to select an operation mode. A shift key is used as an auxiliary key along with another key.

As with the four port selection switches 16, the control panel 4 has four port selection switches 22 that select desired ports. The control panel 4 also has a record switch 23, a rewind switch 24, a reproduction (playback) switch 25, a fast forward switch, and a stop switch. A switch 203 is an edit mode switch. With the data recording and reproducing apparatus 1 according to the embodiment, up to two external VCRs can be remotely controlled. The control panel 4 has two switches that select the external VCRs that are remotely controlled.

The control panel 4 has two dials 29 and 204. The dial 29 is used to designate a reproduction speed and a chronological reproduction direction of A/V data. With three selection switches 205, a mode of the dial 29 is selected. The dial 204 is a rotary encoder that can be rotated and pressed so as to perform a particular control. The dial 204 is referred to as multi-controller. With the dial 204, a desired operation can be selected and a command can be issued corresponding to a list displayed on the displaying portion 200.

The control panel 4 also has a plurality of switches 206A, 206B, 207, and 208 that are used to designate an IN point and an OUT point for the editing operation. With the two switches 206A or two switches 206B, an IN point and an OUT point are designated. When one of two switches 206A or 206B and the entry switch 207 are pressed at the same time, an IN point or an OUT point is designated. The switch 208 is an auto edit switch used to automatically designate an IN point or an OUT point corresponding to a predetermined condition.

Figure 4:
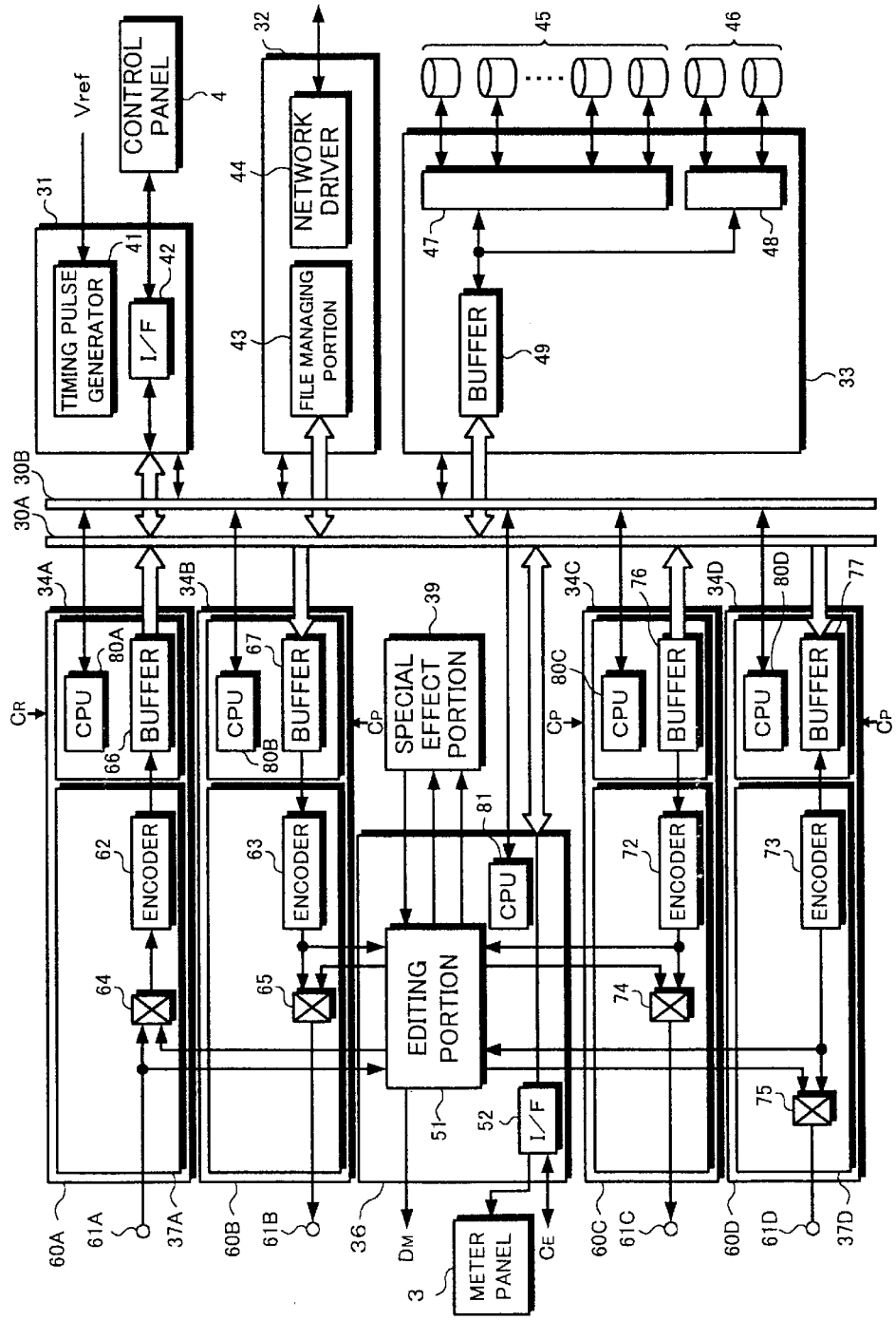
FIG. 4 is a block diagram showing the circuit structure of the data recording and reproducing apparatus according to the embodiment of the present invention.

FIG. 4 is a block diagram showing the circuit structure of the data recording and reproducing apparatus according to the embodiment of the present invention. The data recording and reproducing apparatus 1 according to the embodiment of the present invention has a data bus 30A and a CPU bus 30B.

The data bus 30A sends A/V data, whereas the CPU bus 30B sends a command. A timing managing portion 31, an information managing portion 32, a recording and reproducing portion 33, data managing portions 34A, 34B, 34C, and 34D, and a controlling portion 36 are connected to the buses 30A and 30B. Data input and output portions 37A, 37B, 37C, and 37D are connected to the data managing portions 34A, 34B, 34C, and 34D, respectively. A special effect portion (effector) 39 is connected to the controlling portion 36. The meter panel 3 is connected to the controlling portion 36. The control panel 4 is connected to the timing managing portion 31. These portions 31 to 39 are structured as respective circuit boards.

The timing managing portion 31 has a timing pulse generator 41. The timing pulse generator 41 generates timing pulses and supplies them to predetermined portions. In reality, the timing pulse generator 41 assigns time slots to the ports 60A, 60B, 60C, and 60D. The time slots are assigned by the timing pulse generator 41 to CPUs 80A, 80B, 80C, and 80D through the bus 30B. In the time slot periods, data stored in buffers 66, 67, 76, and 77 is supplied to the recording and reproducing portion 33 through the data bus 30A. A reference video signal Vref is supplied from the outside of the timing pulse generator 41. The timing managing portion 31 has an interface 42 (abbreviated as I/F in FIG. 4). The interface connects the control panel 4 and the data bus 30A.

The information managing portion 32 has a file managing portion 43 and a network driver 44. The file managing portion 43 stores file system information that represents a file record area of a record medium. The file managing portion 43 manages files corresponding to the file system information. The network driver 44 is connected to an external network such as Ethernet so as to input and output data with the external network. Such file management information has been filed by the applicant of the present invention.

The recording and reproducing portion 33 has a video disk array controller 47, an audio disk array controller 48, and a buffer memory 49. The video disk array controller 47 is connected to a plurality of hard disk drives 45 (hereinafter abbreviated as HDDs 45) that record video data. The video disk array controller 47 controls the HDDs 45. The audio disk array controller 48 is connected to a plurality of HDDs 46 that record audio data. The audio disk array controller 48 controls the HDDs 46. The buffer memory 49 is disposed among the disk array controllers 47 and 48 and the data bus 30A. The buffer memory 49 temporarily stores data. The recording and reproducing portion 33 has nine video data HDDs 45 (eight HDDs 45 are used for recording A/V data; one HDD 45 is used for recording parity data). In addition, the recording and reproducing portion 33 has two audio data HDDs 46. The two HDDs 46 and the audio disk array controller 48 are structured corresponding to RAID1.

The controlling portion 36 has and editing portion 51, an interface 52 (abbreviated by I/F in FIG. 4) and a CPU 81. The interface 52 connects the meter panel 3 and the data bus 30A. The CPU 81 is connected to the CPU bus 30B. Thus, the CPU 81 can communicate with other portions connected to the CPU bus 30B. An edit command CE can be input from the outside of the controlling portion 36 to the interface 52. The editing portion 51 has functions of a matrix switcher and an audio mixer. The editing portion 51 is connected to the special effect portion 39. The editing portion 51 has two data output paths for outputting data to the special effect portion 39 and one data input path for inputting data from the special effect portion 39. The editing portion 51 can output monitor data DM.

The special effect portion 39 performs a process for obtaining a special effect such as dissolve effect or wipe effect.

The data input and output portions 37A, 37B, 37C, and 37D are connected to terminals 61A, 61B, 61C, and 61D, respectively. In this example, it is assumed that the terminal 61A is a data input terminal and the terminals 61B to 61D are data output terminals. In addition, it is assumed that A/V data that is input and output with the terminals 61A to 61D is digital data corresponding to for example serial digital interface (hereinafter referred to as SDI and standardized as SMPTE-259M in SMPTE).

The data input and output portion 37A and the data managing portion 34A compose the port 60A. The data input and output portion 37B and the data managing portion 34B compose the port 60B. The data input and output portion 37C and the data managing portion 34C composes the port 60C. The data input and output portion 37D and the data managing portion 34D compose the port 60D.

The data input and output portion 37A has an encoder 62 and a selection switch 64. The encoder 62 extracts video data or the like from the SDI format data and compresses the extracted video data or the like. The selection switch 64 selects one from two inputs. One input terminal of the switch 64 is connected to the terminal 61A; the other input terminal thereof is connected to the editing portion 51. The output terminal of the switch 64 is connected to an input terminal of the encoder 62. The terminal 61A is also connected to the editing portion 51.

The data input and output portion 37B has a decoder 63 and a selection switch 65. The decoder 63 decompresses compressed data and converts it into SDI format data. The selection switch 65 selects one from two inputs. One input terminal of the switch 65 is connected to an output terminal of the decoder 63; the other input terminal is connected to the editing portion 51. The output terminal of the switch 65 is connected to the terminal 61B. The output terminal of the decoder 63 is also connected to the editing portion 51.

The data input and output portion 37C has a decoder 72 and a selection switch 74. The decoder 72 decompresses compressed data and converts it into SDI format data. The selection switch 74 selects one from two inputs. One input terminal of the switch 74 is connected to an output terminal of the decoder 72; the other input terminal of the switch 74 is connected to the editing portion 51. The output terminal of the switch 74 is connected to the terminal 61C. The output terminal of the decoder 72 is also connected to the editing portion 51.

The data input and output portion 37D has a decoder 73 and a switch 75. The decoder 73 decompresses compressed data and converts it into SDI format data. The selection switch 75 selects one from two inputs. One input terminal of the switch 75 is connected to an output terminal of the decoder 73; the other input terminal of the switch 75 is connected to the editing portion 51. The output terminal of the switch 75 is connected to the terminal 61D. The output terminal of the decoder 73 is also connected to the editing portion 51.

The data managing portion 34A has a buffer memory 66 disposed between the output terminal of the encoder 62 of the data input and output portion 37A and the data bus 30A. The data managing portion 34B has a buffer memory 67 disposed between the data bus 30A and the input terminal of the decoder 63 of the data input and output portion 37B. The data managing portion 34C has a buffer memory 76 disposed between the data bus 30A and the input terminal of the decoder 72 of the data input and output portion 37C. The data managing portion 34D has a buffer memory 77 disposed between the data bus 30A and the input terminal of the decoder 73 of the data input and output portion 37D. The buffer 66 stores data in such a manner that input data is output in the assigned time slot period. On the other hand, the buffers 67, 76, and 77 store data in such a manner that data that is output from the recording and reproducing portion 33 is output for each frame to the decoders 63, 72, and 73 in their assigned time slot periods, respectively.

The data managing portion 34A has the above-mentioned CPU 80A that communicates with other portions connected to the CPU bus 30B. Likewise, the data managing portions 34B, 34C, and 34D have the above-mentioned CPUs 80B, 80C, and 80D, respectively, that communicate with other portions connected to the CPU bus 30B.

The data managing portion 34A inputs a record command CR from the outside. The data managing portion 34A sends data that is input from the terminal 61A to the recording and reproducing portion 33 in the assigned time slot period and causes the recording and reproducing portion 33 to perform a recording operation for the data corresponding to the record command CR. A reproduction (playback) command CP can be input to the data managing portions 34B to 34D from the outside. The data managing portions 34B to 34D cause the recoding/reproducing portion 33 to perform a reproducing operation corresponding to the reproduction command CP. In addition, the data managing portions 34B to 34D input the data to the ports 60B to 60D in the assigned time slot periods and cause the data to be output from the terminals 61B to 61D, respectively.

The data input and output portions 37A to 37D and the data managing portions 34A to 34D can be substituted with those of another type. For example, one of output type pairs of the data input and output portion 37B and the data managing portion 34B; the data input and output portion 37C and the data managing portion 34C; and the data input and output portion 37D and the data managing portion 34D can be substituted with an input type pair of the data input and output portion 37A and the data managing portion 34A. In this case, the data recording and reproducing apparatus 1 becomes an apparatus having two input ports and two output ports. Of course, in various combinations, for example, the data recording and reproducing apparatus 1 can be used as an apparatus having one output port and three input ports.

Next, the operation of the data recording and reproducing apparatus 1 according to the embodiment of the present invention will be described. First of all, the operation for recording A/V data that is input from the outside will be described. SDI format data is input to the terminal 61A. This data is sent to the encoder 62 through the switch 64 of the data input and output portion 37A. The encoder 62 compresses the input data. The compressed data is temporarily stored in the buffer memory 66 of the data managing portion 34A. The data managing portion 34A accesses the recording and reproducing portion 33 in the assigned time slot period and sends data stored in the buffer memory 66 to the recording and reproducing portion 33 through the data bus 30A.

In the recording and reproducing portion 33, the received data is temporarily stored in the buffer memory 49. Thereafter, the data is read from the buffer memory 49 and then video data and audio data thereof are input to the video disk array controller 47 and the audio disk array controller 48, respectively. The video disk array controller 47 divides the input video data in a predetermined unit, calculates parity data, and records the divided data and the parity data to a predetermined one of the HDDs 45. On the other hand, the audio disk array controller 48 records the input audio data to the two HDDs 46.

Next, the operation for outputting recorded data to the outside will be described. In this case, a predetermined one of the data managing portions 34B to 34D accesses the recording and reproducing portion 33 in the assigned time slot period and causes the recording and reproducing portion 33 to reproduce data. In the data reproducing portion 33, the video disk array controller 47 reads divided video data and parity data from the HDDs 45. The video disk array controller 47 combines the divided video data that is read from the HDDs 45 and detects and corrects an error of the combined video data corresponding to the parity data. The audio disk array controller 48 reproduces error-free audio data from one of the two HDDs 46. The reproduced video data and audio data are temporarily stored to the buffer memory 49. Thereafter, the video data and audio data are read from the buffer memory 49 and sent to one of the data managing portions 34B to 34D through the data bus 30A.

When data is output from the terminal 61B to the outside, the reproduced data is supplied to the decoder 63 of the data input and output portion 37B through the buffer memory 67 of the data managing portion 34B. The decoder 63 decompresses the reproduced data and converts it into SDI format data. The SDI format data is output from the terminal 61B to the outside through the switch 65. Alternatively, the reproduced data is sent to the decoder 72 of the data input and output portion 37C through the buffer memory 76 of the data managing portion 34C. The decoder 72 decompresses the reproduced data. The decompressed data is output from the terminal 61C to the outside through the switch 74. Alternatively, the reproduced data is sent to the decoder 73 of the data input and output portion 37D through the buffer memory 77 of the data managing portion 34D. The decoder 73 decompresses the reproduced data. The decompressed data is output from the terminal 61D to the outside through the switch 75.

In the data recording and reproducing apparatus 1 according to the embodiment of the present invention, since the data managing portions 34A to 34D operate on time division basis, the same data or different data can be output simultaneously from the three terminals 61B to 61D.

Next, the operation for editing data will be described. The editing portion 51 of the controlling portion 36 performs an editing operation using at least one of data that is input from the outside and data reproduced from the recording and reproducing portion 33. In other words, the editing portion 51 can input data from the outside through the terminal 61A and data that is reproduced by the recording and reproducing portion 33 and decompressed by the decoders 63, 72, and 73. With at least one of these input data, the editing portion 51 performs an editing operation using the local matrix switcher and audio mixer. When necessary, the editing portion 51 performs the editing operation using the special effect portion 39. The editing, portion 51 can perform an AB role editing operation for a special effect such as dissolve effect or wipe effect.

The editing portion 51 can output edited data to one of the switches 64, 65, 74, and 75. The data that is output to the switch 64 is recorded to the HDDs 45 and 46 by the recording and reproducing portion 33. The data that is output to the switches 65, 74, and 75 are output from the terminals 61B, 61C, and 61D, respectively.

In the data recording and reproducing apparatus 1 according to the embodiment of the present invention, with the meter panel 3, various operations such as an input port selecting operation of A/V data, an audio data recording/reproduction level adjusting operation, and an audio data monitor channel selecting operation can be performed. The displaying portion 11 of the meter panel 3 can display the operation states of the four ports.

In the data recording and reproducing apparatus 1 according to the embodiment, with the control panel 4, the editing operation can be performed.

Next, the above-mentioned file system will be described in detail. The file system is a system that manages record positions of files recorded in the HDDs 45 of the recording and reproducing portion 33 as the server portion. The file managing portion 43 performs the file managing operation of the file system.

The file system information is mainly composed of three types of information:

(1) file entry information,
(2) record entry information, and
(3) free space list information.

Figure 5A:
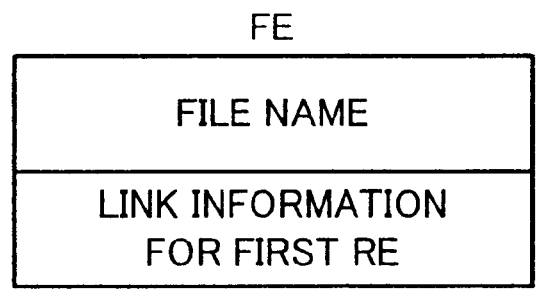
FIGS. 5A, 5B, and 5C are schematic diagrams showing outlined structures of file entry information, record entry information, and free space information.
Figure 5B:
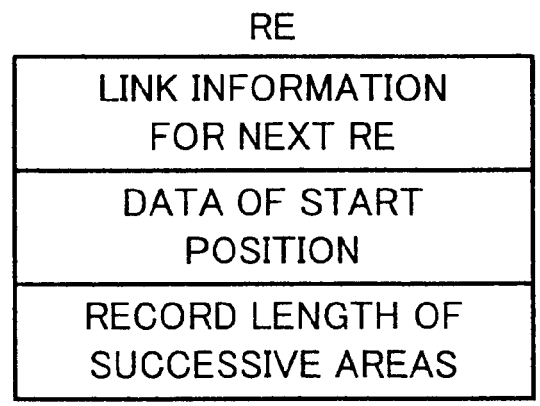
Figure 5C:
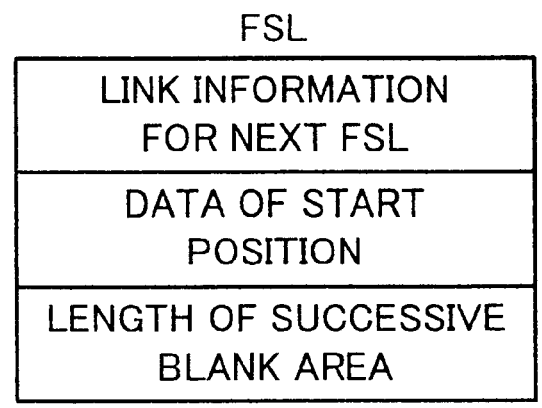

FIGS. 5A, 5B, and 5C show examples of these three types of information. The file entry information, the record entry information, and the free space information are stored as file management information to the information managing portion 32.

The file entry information (1) shown in FIG. 5A is composed of a file name and pointer information for the first record entry information. Thus, the file entry information is generated for each file. The file entry information is linked to record entry information corresponding to link information. When a record entry is recorded to a memory (not shown) of the file managing portion 43, the link information is equivalent to pointer information for an address at which the record entry is recorded.

The record entry information (2) as shown in FIG. 5B contains address information and data length information. The address information represents the start address of a file in the HDDs 45. The data length information represents the data length of a successive area for which the file is successively written from the start address. The record entry information also contains link information for the next record entry information.

One file may be separately written in different areas of the HDDs 45. In this case, record entry information is generated for each separated area. The link information is for example pointer information that represents a link to record entry information that is the next area of the separated file. When the record entry information for each separated area is traced for pointer information contained in link information, address information of a file separately recorded in different areas can be obtained. When a file is completed in a successive area, for example "EOF (End Of File)" is written as link information.

FIGS. 6A, 6B, and 6C show a file accessing operation using record entry information. In this example, it is assumed that a file with a file name "A" (hereinafter, this file is abbreviated as file "A") is written to an address apace of an HDD as shown in FIG. 6A. In other words, the file "A" is divided into three portions. The first portion, the second portion, and the third portion of the file "A" are written to address "50" to address "100", address "200" to address "300", and address "500" to address "750". In the following description, the values of addresses correspond to record/reproduction duration (minutes). For example, the address length "100" from address "100" to address "200" is represented as reproduction length "100".

FIG. 6B shows examples of file entry information (FE) and record entry information (RE) corresponding to the divided file portions shown in FIG. 6A. The file entry information contains the file name "A" and link information that links to the first record entry information. The link information represents the file name of the first record entry information to be linked first. Alternatively, the position of record entry information (for example, pointer information that represents an address) may be directly used as link information.

In the example of which the file "A" is divided into three portions, three sets of record entry information are generated. The first portion is successively written from address "50" to address "100" for data length "50". In other words, data is successively written from address "50" to address "100". The file "A" is written to the next successive area. When The link information is traced, record entry information that represents the next successive area of the file "A" is referenced. The record entry information represents that data is written to a successive area starting from address "200" for data length "100" (namely, from address "100" to address "200"). The file is also written to the next (third) successive area. As with the second successive area, when the link information is traced, record entry information that represents the third successive area of the file "A" is referenced. Since the file "A" ends at address "750", the record entry information is not linked to another successive area. The record entry information contains "EOF" as link information.

The free space list information (3) contains information of a blank area in which data is not written. The structure of the free space list information is similar to the structure of the record entry information. In other words, as shown in FIG. 5C, the free space list information contains address information at which a blank area in which data is not written starts and the length of the blank area. In addition, the free space list information contains link information for the next free space list information. The link information is for example a file name of the first free space list information to be linked. Alternatively, the position of free space list information (for example, pointer information that represents an address) may be directly used as link information.

FIG. 6C shows a plurality of sets of free space list information that are linked corresponding to the divided portions of the file A shown in FIG. 6A. In the example shown in FIG. 6A, an area from address "0" to address "50", an area from address "100" to address "200", and an area from address "300" to address "500" are areas in which data is not written. Thus, as shown in FIG. 6C, the first free space list information represents that the start address of the successive blank area is "0" and that the length thereof is "50". When the link information is traced, the next free space list information is referenced. The second free space list represents that the start address of the blank area is "100" and that the length thereof is "100". When the link information is traced, the next (third) free space information is referenced. The third free space information represents that the start address of the blank area is "300" and that the length thereof is "200". The free space list information contains "EOF" that represents there is no blank area in the HDD. Thus, when a plurality of sets of free space list information are successively referenced corresponding to link information, blank areas of the HDD can be obtained.

With three types of information as file entry information, record entry information, and free space information according to the embodiment of the present invention, the file system that manages files recorded in the HDDs 45 is structured. In the case that the file "A" has been written to the HDDs 45, when another file "B" is written to the HDDs 45, file entry information is generated corresponding to the file "B". With reference to free space list information, the file "B" is written to the HDDs 45. At this point, record entry information is generated corresponding to the write address and the data length of the file "B". Since the file "B" is written, the blank areas of the HDDs 45 vary. Thus, the free space list information is rewritten.

These file entry information, record entry information, and free space information are registered as file management information to for example the file managing portion 43.

Next, the editing operation for A/V data according to the embodiment of the present invention will be described. In this embodiment, an edited result is not output as a real A/V data file. Instead, a virtual file that represents an edited result is generated (hereinafter, the virtual file is referred to as virtual file list VFL). The VFL contains information necessary for the data recording and reproducing apparatus 1 to reproduce the edited result.

An editing device is connected to the data recording and reproducing apparatus 1. In the data recording and reproducing apparatus 1 according to the embodiment, with the control panel 4, stored A/V data can be edited. In this example, the case that an external editing device is connected to the data recording and reproducing apparatus 1 will be described.

Various commands such as an edit command CE, a playback (reproduction) command CP, and a record command CR are supplied from the data recording and reproducing apparatus 1 to the editing device. When the file "A" stored in the data recording and reproducing apparatus 1 is edited, information that represents the file "A" is supplied from the editing device to the data recording and reproducing apparatus 1. Since the data recording and reproducing apparatus 1 manages areas of the file "A" recorded in the HDDs 45 corresponding to file management information stored in the information managing portion 32, the information managing portion 32 issues the reproduction (playback) command to the recording and reproducing portion 33 and causes it to reproduce the file "A". The reproduced file "A" is supplied to for example the port 60B through the data bus 30A and then transmitted to the editing device through the port 60b.

The file "A" is input to the editing device. The picture and sound of the file "A" are output from a monitor that is built in or connected to the editing device. While observing the picture with the monitor, the editing operator who edits the file "A" designates edit points that represent a portion used in the file "A" with an operating means disposed in the editing device. The editing operation includes various operations such as a designating operation for an IN point and an OUT point that represent a reproduction start point and a reproduction end point, respectively, and a special effect operation such as wipe effect or dissolve effect. Next, the case that the operator designates an IN point and an OUT point will be described.

After an IN point and an OUT point have been designated, the edited result is sent to the data recording and reproducing apparatus 1. At this point, according to the embodiment, along with the file name of the edited A/V file, only the information of the designated IN point and OUT point is sent to the data recording and reproducing apparatus 1. In other words, a real A/V file corresponding to the edited result is not generated. The above-mentioned VFL is composed of the file name and information of the designated IN point and OUT point.

The generated VFL is sent to the data recording and reproducing apparatus 1. After the VFL is sent to the data recording and reproducing apparatus 1 and stored to a memory (not shown) of the information managing portion 32, the editing operation is completed. When the data recording and reproducing apparatus 1 reads A/V data stored in the HDDs 45 corresponding to the VFL, the edited material is output. In other words, when the VFL is used, it is not necessary to record the edited result as a new A/V file. Thus, the material can be edited and the edited result can be sent on real time basis.

Figures 7, 8, 9A, 9B, 10:
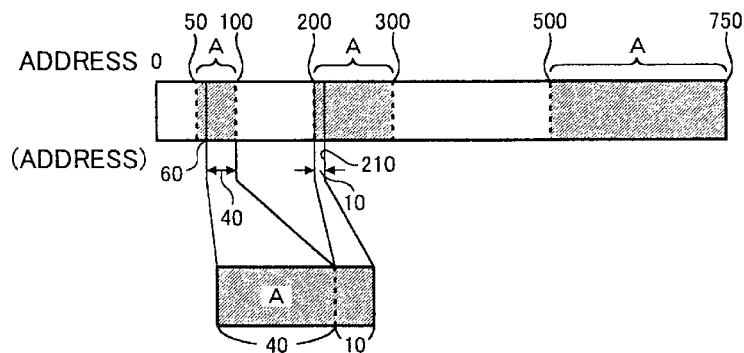
FIG. 7 is a schematic diagram showing an example of the structure of a virtual file VFL.
FIG. 8 is a schematic diagram showing an example of the structure of fields of the virtual file VFL.
FIGS. 9A and 9B are schematic diagrams for explaining a process for reproducing a file separately written in different fields using a virtual file VFL.
FIG. 10 is a schematic diagram showing another example of fields of a virtual file VFL

FIG. 7 shows an example of the structure of the VFL. The VFL contains the file name of a relevant A/V file, the reproduction start position of the file (namely, information of an IN point), and the reproduction end position of the file (namely, information of an OUT point). The reproduction start position and the reproduction end position are address information of the start position and the end position of the address space of the relevant A/V file.

In the example shown in FIG. 6A, when position "10" and position "60" of a file "A" with length "400" are designated as an IN point and an OUT point, respectively, as shown in FIG. 8, the reproduction start position and the reproduction end position are "10" and "80", respectively.

As was described above, when a file is written to the HDDs 45, the file may be separately written to different areas of the HDDs 45. The separated file portions can be managed as one successive file by the file managing portion 43 that successively traces link information of record entry information.

Next, it is considered that a reproduction start position and a reproduction end position of the VFL may be separately written in different areas of the HDDs 45. FIGS. 9A and 9B show an operation performed corresponding to the case shown in FIG. 6A. FIG. 9A shows areas of a file "A" that are separately recorded in the HDDs 45. FIG. 9B shows a reproduction start position and a reproduction end position of the address space of the VFL.

The file managing portion 43 accesses the reproduction start position contained in the VFL of the file "A" with the file start position data and the record length data of the successive area contained in the record entry information corresponding to the file entry information and the record entry information. In the example shown in FIG. 9A, the start position of the file "A" is address "50" of the address space of the HDDs 45. Since the VFL represents that the reproduction start position is address "10" of the address space for the file "A", it is reproduced from address "60" of the address space of the HDDs 45 (address "60" is obtained by adding length "10" to address "50" of the address space of the HDDs 45).

When the reproduction length that exceeds the record length of the successive area represented in the record entry information is designated with the reproduction start position and the reproduction end position of the VFL, the next record entry information is linked with the link information of the record entry information. In the example shown in FIG. 9A, the reproduction length represented by the VFL is "50", whereas the record area represented by the first record entry information is from address "50" to address "100" of the address space of the HDDs 45. Since the file "A" is reproduced from address "60", to reproduce the file "A" for the reproduction length designated by the VFL, it is necessary to further reproduce data for length "10". The data with length "10" is reproduced from the file start position represented by the next record entry information linked corresponding to the link information. In other words, data from address "200" to address "210" of the address space of the HDDs 45 is reproduced.

In other words, a reproduction area represented by the VFL for the file "A" in the address space of the VFL is separately written to a first areas with length "40" and a second area with length "10" of the HDDs 45 corresponding to a successive area of the address space of the HDDs 45 as shown in FIG. 9B.

On the other hand, when the VFL contains information as shown in FIG. 10, in the address space of the HDDs 45, data is reproduced as a successive area from address "60" to address "100".

Figure 11:
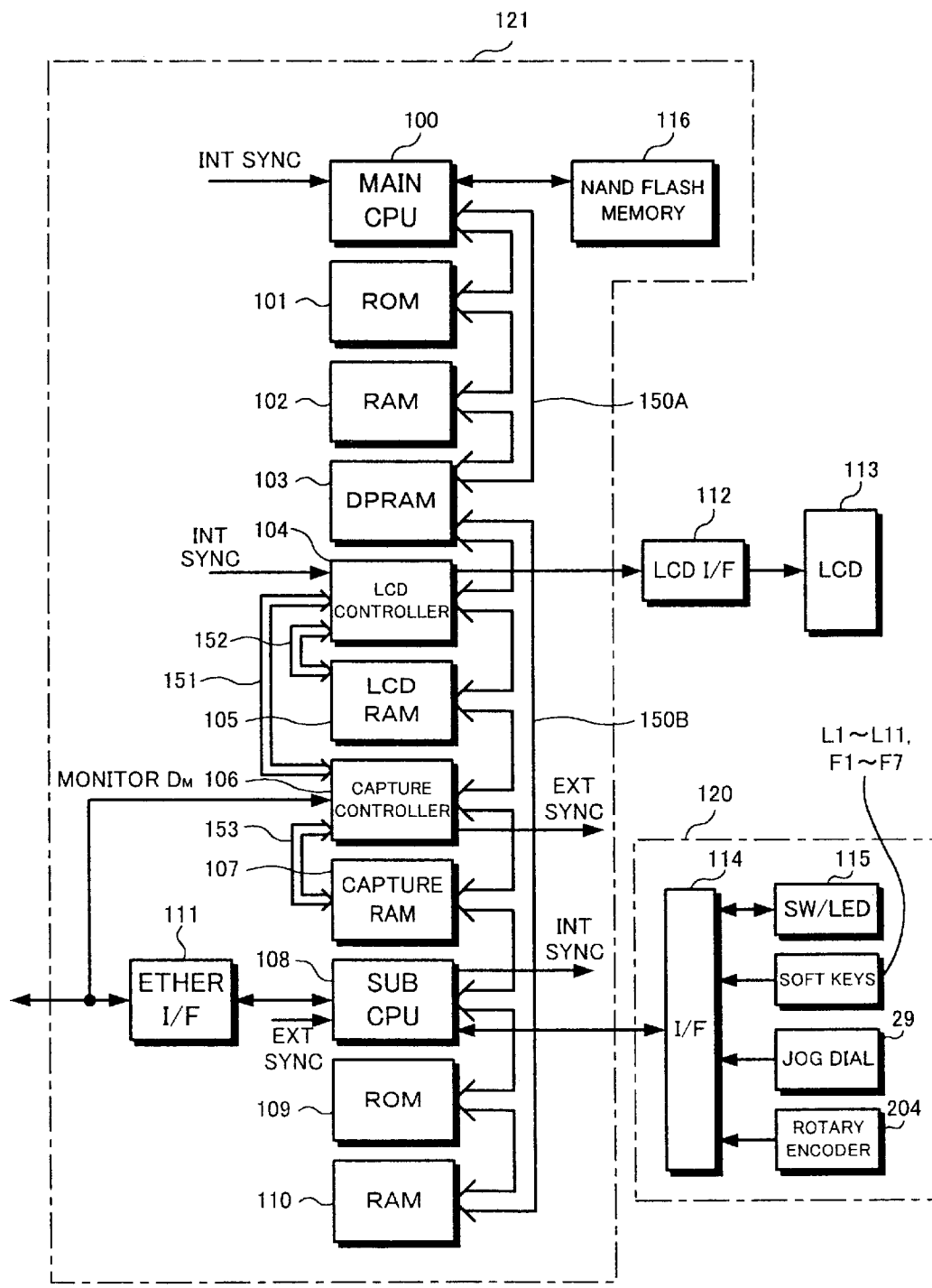
FIG. 11 is a block diagram showing an example of the structure of the control panel.

FIG. 11 shows an example of the structure of the control panel 4. The control panel 4 has a switch board portion 120 and a CPU board portion 121. In addition, the control panel 4 has an LCD (Liquid Crystal Display) 113 and an LCD I/F 112. The LCD I/F 112 is an interface that interfaces with the CPU board 121 and the LCD 113. The LCD 113 corresponds to the displaying portion 200 of the control panel 4.

In the CPU board portion 121, a main CPU 100, a ROM 101, a RAM 102, and a DPRAM (dual port RAM) 103 are connected to a bus 150A. The main CPU 100 operates corresponding to program data stored in the ROM 101. The main CPU 100 performs a process for receiving a command from the outside. The RAM 102 is a work memory of the CPU 100. A NAND flash memory 116 that is a data rewritable memory is connected to the main CPU 100. An internal synchronous signal (INT SYNC) generated by a sub CPU 108 (that will be described later) is supplied to the main CPU 100.

The DPRAM 103 is a RAM having two input/output ports that independently input and/or output data. The main CPU 100 communicates with the sub CPU 108 through the DPRAM 103.

On the other hand, in the CPU board 121, the sub CPU 108, a ROM 109, a RAM 110, and the DPRAM 103 are connected to a bus 150B. The sub CPU 108 operates corresponding to program data stored in the ROM 109 and controls peripheral portions. The RAM 110 is a work memory for the sub CPU 108. An external synchronous signal (EXT SYNC) that is output from a capture controller 106 (that will be described later) is supplied to the sub CPU 108. The sub CPU 108 generates the above-described internal synchronous signal.

In addition, an Ether I/F 111 that is a communication interface corresponding to Ethernet standard is connected to the sub CPU 108. The CPU board 121 (namely, the control panel 4) is connected to an interface 42 through the Ether I/F 111. Thus, the CPU board 121 communicates with the data recording and reproducing apparatus 1. A monitor output DM that is received from the editing device 51 of the data recording and reproducing apparatus 1 is supplied to the capture controller 106 (that will be described later). In FIG. 11, the monitor output DM and a signal supplied to the Ether I/F 111 are connected. This means that a common connector is used for the monitor output DM and the signal sent to the Ether I/F 111.

An interface 114 (that will be described later) of the switch board portion 121 is connected to the sub CPU 108.

An LCD controller 104, an LCD RAM 105, a capture controller 106, and a capture RAM 107 are connected to the bus 150B.

The LCD controller 104 controls the display of the LCD 113 corresponding to the supplied internal synchronous signal. The LCD RAM 105 is composed of two memories that are an upper memory and a lower memory of which display data of the upper half of the display area of the LCD 113 and display data of the lower half thereof are written to addresses corresponding to the display positions. The display data is supplied from for example the main CPU 100 or the capture controller 106 (that will be described later) to the LCD controller 104. The LCD controller 104 alternately writes and reads data to/from the two memories of the LCD RAM 105 so that one screen of the LCD 113 is formed. The data that is read from the LCD RAM 105 is supplied to the LCD controller 104 through the bus 152. The display data that is output from the LCD controller 104 is supplied to the LCD 113 through the LCD I/F 112. The LCD 113 displays the supplied display data.

As described above, video data that is the monitor output DM of the data recording and reproducing apparatus 1 is supplied to the capture controller 106. The capture RAM 107 is composed of two memories that are an odd memory and an even memory corresponding to odd fields and even fields, respectively. The capture controller 106 alternately switches these two memories corresponding to relevant fields of the video data and captures field pictures at predetermined timings. The video data that is read from the capture RAM 107 is supplied to the capture controller 106 through the bus 152. The capture controller 106 generates a synchronous signal corresponding to the supplied video data and outputs the synchronous signal as an external synchronous signal.

As will be described later, the capture controller 106 and the LCD controller 104 are connected with a bus 151. Video data supplied to the capture controller 106 is thinned out at predetermined intervals and thereby the picture size is reduced. The reduced video data is supplied to the LCD controller 104. Thus, the displaying portion 200 can display a moving picture.

In the switch board portion 120, the dials 29 and 104, the soft keys L1 to L11 and F1 to F7, and a SW/LED 115 are connected to the interface 114. Rotation angle information of the dial 29 is supplied to the interface 114. Rotation angle information and pressure information of the dial 104 are supplied to the interface 114. Pressure information of the soft keys L1 to L11 and F1 to F7 is supplied to the interface 114. On the other hand, the SW/LED 115 is a switch block including switches having displaying means of for example LEDs (Light Emission Diodes). For example, the switches 22 to 28, the switch 203, and the switches 205 to 208 correspond to the SW/LED 115. Pressure information of the SW/LED 115 is supplied to the interface 114. A display control signal of the displaying means is supplied from the interface 114 to the SW/LED 115. The interface 114 converts pressure information and rotation angle information supplied from the dials 29 and 104,the soft keys L1 to L11 and F1 to F7, and the SW/LED 115 into predetermined control signals and supplies the control signals to the sub CPU 108.

As described above, the displaying portion 200 (namely, the LCD 113) can display:

(1) a list of A/V files stored in the recording and reproducing portion 33, (2) a moving picture that is input from a video camera or the like connected to the data recording and reproducing apparatus 1, (3) a still picture (stamp picture) obtained at the beginning of the recording operation, and (4) still pictures and moving pictures for an IN point and an OUT point in the editing operation.

First, a method for displaying the file list (1) will be described. The file names of A/V files stored in the recording and reproducing apparatus 33 are registered as file management information to the file managing portion 43. For example, when the data recording and reproducing apparatus 1 gets started, a CPU board portion 120 of the control panel 4 requests the file managing portion 43 for the file management information. Thus, the file management information is read from the file managing portion 43. In this case, at least a file name and a material number added thereto are read as the file management information. The file management information that is read from the file managing portion 43 is supplied to the CPU board portion 120 through the Ether I/F 111 and written as file list information to for example the NAND flash memory 116.

In the switch panel portion 120, when the switches 23 and 25 on the control panel 4 are operated at the same time, a record command for video data that is input to for example the port 60A is issued. This command is supplied to the CPU board portion 121. When the CPU board portion 121 receives the command, a file name that is not used in the file list information is generated as a record file name. The record command and the record file name are suppled from the CPU board portion 121 to the CPU 80A of the board 60A.

The record file name is also supplied to the file managing portion 43. The file managing portion 43 opens a file with the record file name for a blank area of the recording and reproducing portion 33 corresponding to the free space list information registered as the file management information. The video data that is input to the port 60A is processed in a predetermined manner and then supplied to the recording and reproducing portion 33. The recording and reproducing portion 33 starts recoding the video data to the file with the record file name.

When the recording operation gets started, the record file name is supplied to the CPU board portion 121 of the control panel 4 through the file managing portion 43. Thus, the file list information stored in the memory 116 is updated with the record file name. The updated file list information is supplied to the LCD controller 104 through the DPRAM 103. The file list of the LCD RAM 105 is written as display data to an address corresponding to the display position of the LCD 113. The display data is read from the LCD RAM 105 and supplied to the LCD 113 through the LCD I/F 112. The LCD 113 displays the display data as a file list.

Figure 12:
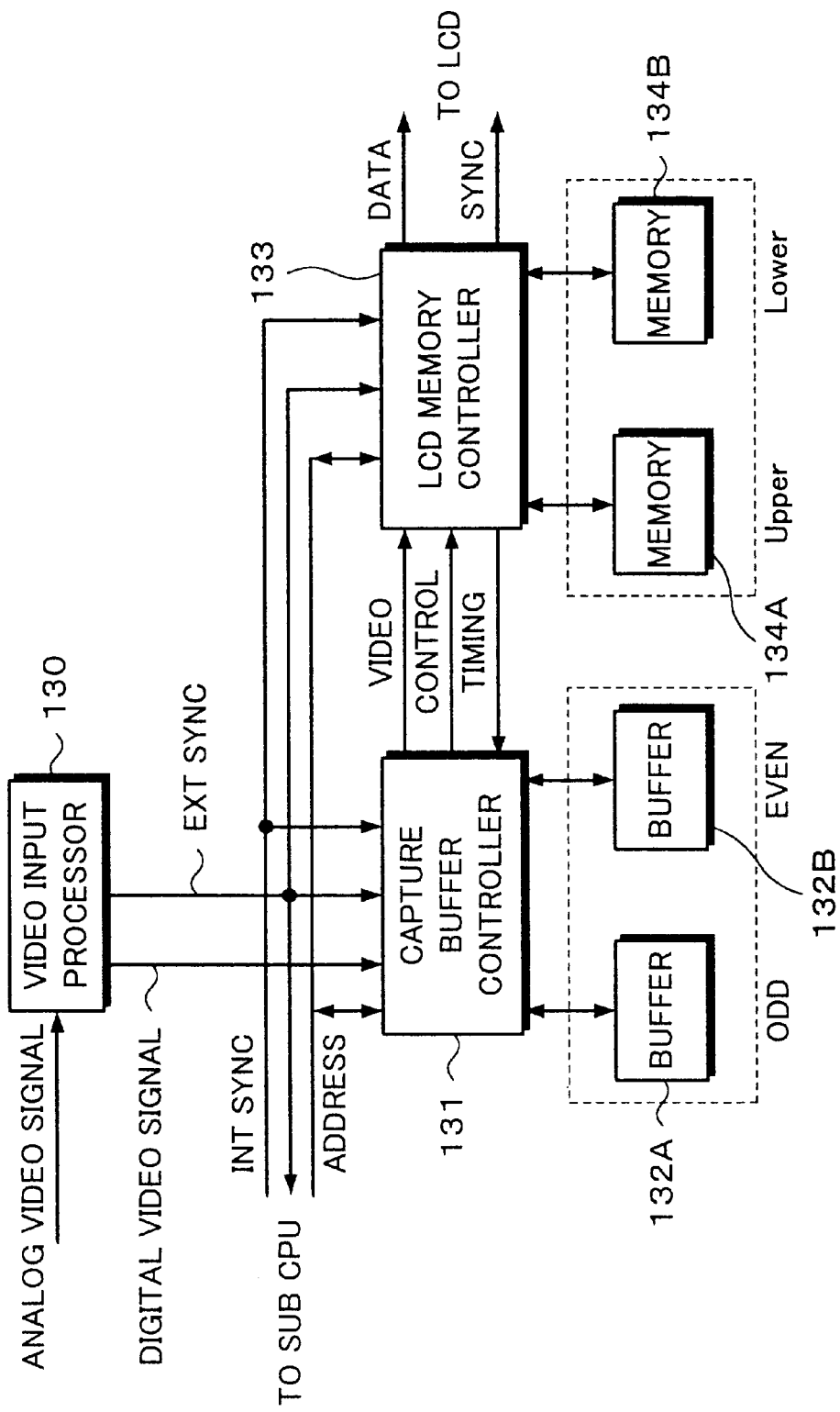
FIG. 12 is a block diagram showing the structure of a moving picture displaying portion of the control panel.

Next, a method for displaying a moving picture (2) that is input from a video camera or the like connected to the data recording and reproducing apparatus 1 will be described. FIG. 12 is a block diagram showing the structure of a moving picture displaying portion of the control panel shown in FIG. 11. A video processor 130 and a capture controller 131 correspond to the capture controller 106 shown in FIG. 11. An LCD memory controller 133 corresponds to the LCD controller 105. Two buffers 132A and 132B connected to the capture buffer controller 131 correspond to the two memories of the capture RAM 107. The buffer 132A stores picture data of an odd field. The buffer 132B stores picture data of an even field. Likewise, two memories 134A and 134B connected to the LCD memory controller 133 store display data of an upper portion and a lower portion of the LCD 113 at addresses corresponding to display positions, respectively.

The monitor output DM is supplied as an analog video signal to the video input processor 130. The video input processor 130 converts the supplied analog video signal into digital video data and supplies it to the capture buffer controller 131. At this point, the video input processor extracts a synchronous signal from the analog video signal. The extracted synchronous signal is supplied as an external synchronous signal to the capture buffer controller 131.

The capture buffer controller 131 averages for example every four lines of the supplied video data. Likewise, the capture buffer controller 131 performs an interpolating process in the horizontal direction of the supplied video data. Thus, the picture size of the video signal that is input to the processor 130 is reduced to ¼ in each of the vertical direction and the horizontal direction. The odd field and even field of the resultant picture data are alternately written to the buffers 132A and 132B, respectively, under the control of the capture buffer controller 131.

Picture data is read from one of the buffers 132A and 132B while picture data is written to the other. The picture data that is read from one of the buffers 132A and 132B is supplied to the LCD memory controller 133.

The sub CPU 108 supplies display data such as file list information to the LCD memory controller 131. The LCD memory controller 133 alternately writes display data to one of the memories 134A and 134B corresponding to the upper area and the lower area of the LCD 113 and reads display data from the other, field by field. The display data that is read from one of the memories 134A and 134B and the internal synchronous signal are supplied to the LCD 113.

When display data is alternately updated in the memories 134A and 134B, field by field, there is a blanking interval in which the display data is not-read from the memories 134A and 134B to the LCD 113. Video data written to the buffers 132A and 132B is written to the memories 134A and 134B at the blanking interval under the control of the capture buffer controller 131 and the LCD memory controller 133. At this point, corresponding to address data supplied to the capture buffer controller 131 and the LCD memory controller 133, the write addresses of the memories 134A and 134B are controlled so that the video data displayed at a predetermined position.

The video data that is supped as the monitor output DM from the data recording and reproducing apparatus 1 is delayed by one field and output to the LCD 113.

Next, with reference to FIG. 11, a method for displaying a stamp picture (3) obtained at the beginning of the recording operation will be described. According to the embodiment of the present invention, when video data that is input from a video camera connected to the data recording and reproducing apparatus 1 is recorded, the top picture of the video data can be stored as a stamp picture to the flash memory 116. In other words, picture data for one field is obtained when the recording operation is performed. The obtained picture data is reduced in a predetermined method, correlated with file information such as a material number and a file name of a record file, and stored as a stamp picture to the flash memory 116. When a file is selected from the above-described file list being displayed, a stamp picture that has been stored can be displayed on the displaying portion 200.

For example, it is assumed that a video camera is connected to the port 60A and then a record command is issued from the control panel 4 so as to record video data. Video data that is output from the video camera connected to the port 60A is always supplied from the terminal 61A to the port 60A. The video data is input to one input terminal of the switch 64 and supplied to the editing portion 51. The video data that is supplied to the editing portion 51 is output as a monitor output DM and supplied to the capture controller 106 of the control panel 4. The monitor output DM is displayed on the LCD 113 in the above-described method for displaying a moving picture (1).

When the operator presses the record switch 23 and the reproduction (playback) switch 25 of the control panel 4 at the same time, a relevant signal is supplied to the sub CPU 108. The sub CPU 108 outputs a record start request corresponding to the signal. The record start request is supplied from the sub CPU 108 to the main CPU 100 through the DPRAM 103. The main CPU 100 issues a record command to the port 60A corresponding to the supplied record start request. The record command is supplied to the data recoding/reproducing apparatus 1 through the Ether I/F 111 and then supplied to the port 60A.

In addition to the record command, the main CPU 100 supplies to the sub CPU 108 a capture request for video data supplied as the monitor output DM to the capture controller 106. The capture request causes a command to be issued so that video data is captured when the recording operation is started. In other words, the recording operation corresponding to the record command issued by the main CPU is delayed for a predetermined time period. Since the delay time period is known, the capture request is issued so that the video data is delayed for the predetermined time period.

Corresponding to the capture request, the sub CPU 108 causes the capture controller 106 to capture video data. In other words, as described in the method displaying a moving picture (2), video data is always processed in a predetermined manner under the control of the capture controller 106 and the LCD controller 104. The resultant video data is supplied to the LCD 113. Thus, when the capture request is issued, data is read from the capture RAM 107. Thus, video data for one field can be captured. The captured picture data is written to the RAM 103 through the DPRAM 103.

When the recording operation for video data has been normally started on the port 60A, a relevant message is sent from the port 60A to the main CPU 100. In other words, the message that represents that the recording operation has been normally started and file information of the recording video data such as a material number are output. The message and the file information are supplied to the sub CPU 108 of the CPU board portion 120 through the CPU bus 30B, the interface 42, the Ether I/F 111, and so forth. In addition, the message and the file information are supplied from the sub CPU 108 to the main CPU 100 through the DPRAM 103. The main CPU 100 correlates the captured picture data written to the RAM 102 with the file information and writes the resultant data to the NAND flash memory 116.

When the main CPU 100 receives a message that represents that the recording operation has not been normally started, the captured picture data written to the RAM 102 is discarded.

In the above-mentioned example, the case that the top picture of video data is stored as a stamp picture was described. However, it should be noted that the present invention is not limited to such an example. Instead, after the recording operation is started, an intermediate picture may be stored as a stamp picture. Alternatively, the last picture of the video data may be stored as a stamp picture.

Next, a method for displaying stamp pictures (4) for an IN point and an OUT point in the editing operation will be described. When the editing operation is performed, an A/V file is reproduced from the recording and reproducing portion 33. Video data reproduced by the recording and reproducing portion 33 is supplied to for example the port 60B and output as a monitor output DM through the decoder 63 and the editing portion 51. The monitor output DM is displayed on the LCD 113 through the capture controller 106. With the monitor output DM displayed on the LCD 113, an IN point and an OUT point are designated. Since the operation for obtaining a stamp picture for an IN point is the same as that for an OUT point, for simplicity, only the operation for obtaining an IN point will be described.

The stamp picture is obtained in almost the same as the method for displaying a stamp picture (3) obtained at the beginning of the recording operation. When the edit key 203 is pressed on the control panel 4, the data recording and reproducing apparatus 1 operates as an edit mode.

In addition to the edit mode, the data recording and reproducing apparatus 1 has a material mode and a setup mode. The material mode is used to record or reproduce data to/from a file. The setup mode is used to set various types of information for the data recording and reproducing apparatus 1.

When the switch 25 is pressed, video data is reproduced from a selected A/V file. The reproduced video data is displayed as a moving picture on the LCD 113 in the above-described manner. While observing video data displayed on the LCD 113, the operator presses the IN point input switch of the switch 206B and the switch 207 at the same time so as to designate an IN point. The designated IN point information is supplied to the sub CPU 108 through the interface 114. In addition, the designated IN point information is supplied to the main CPU 100 through the DPRAM 103.

Corresponding to the designated IN point information, a capture request is issued from the main CPU 100 to the sub CPU 108 through the DPRAM 103 so that video data is captured when the IN point is designated. The sub CPU 108 causes the capture controller 106 to capture video data. A stamp picture of which video data has been captured is written to the RAM 102. Predetermined edit data is added to the stamp picture written to the RAM 102. The resultant data is stored to the NAND flash memory 116.

The edit data added to the stamp picture contains for example an identification of an IN point or an OUT point for a stored stamp picture and a page number. The page number is data equivalent to one edit cut. The page number represents the order of edit cuts of a material to be edited.

Figure 13:
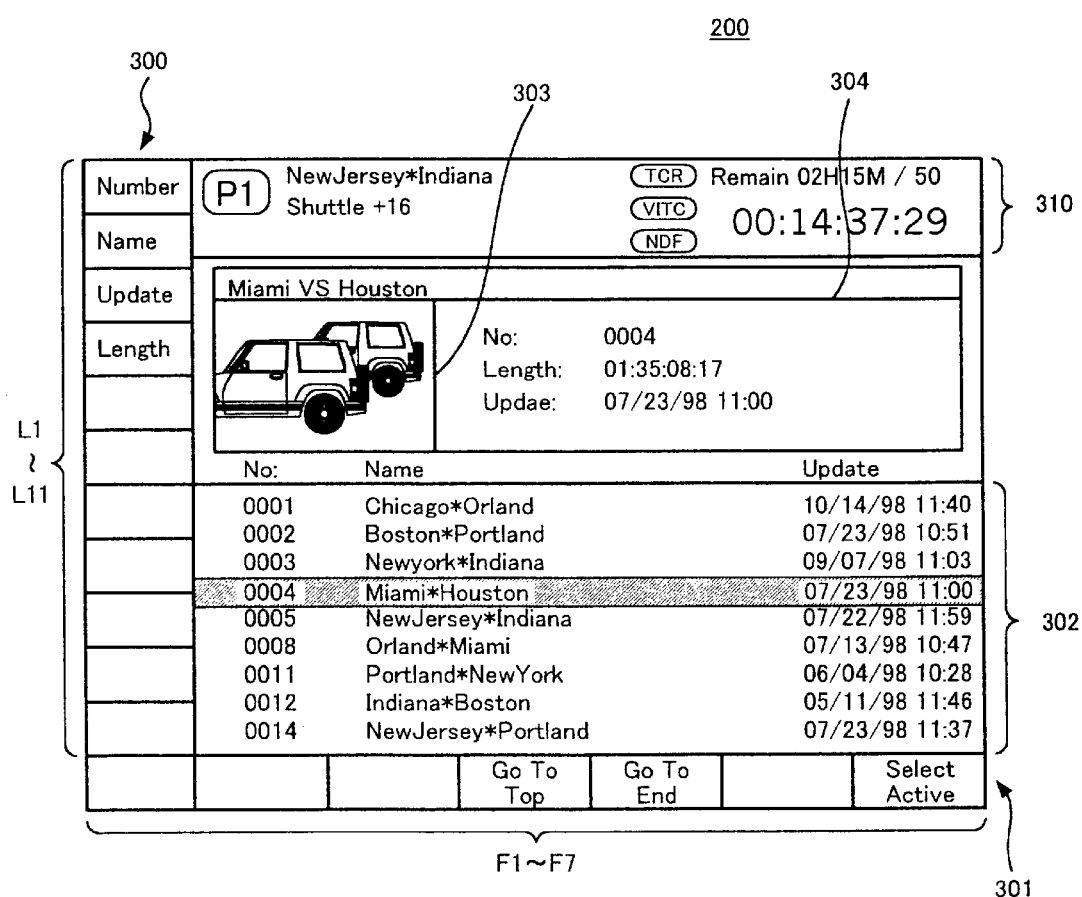
FIG. 13 is a schematic diagram showing an example of information displayed on a displaying portion.
Figure 15:
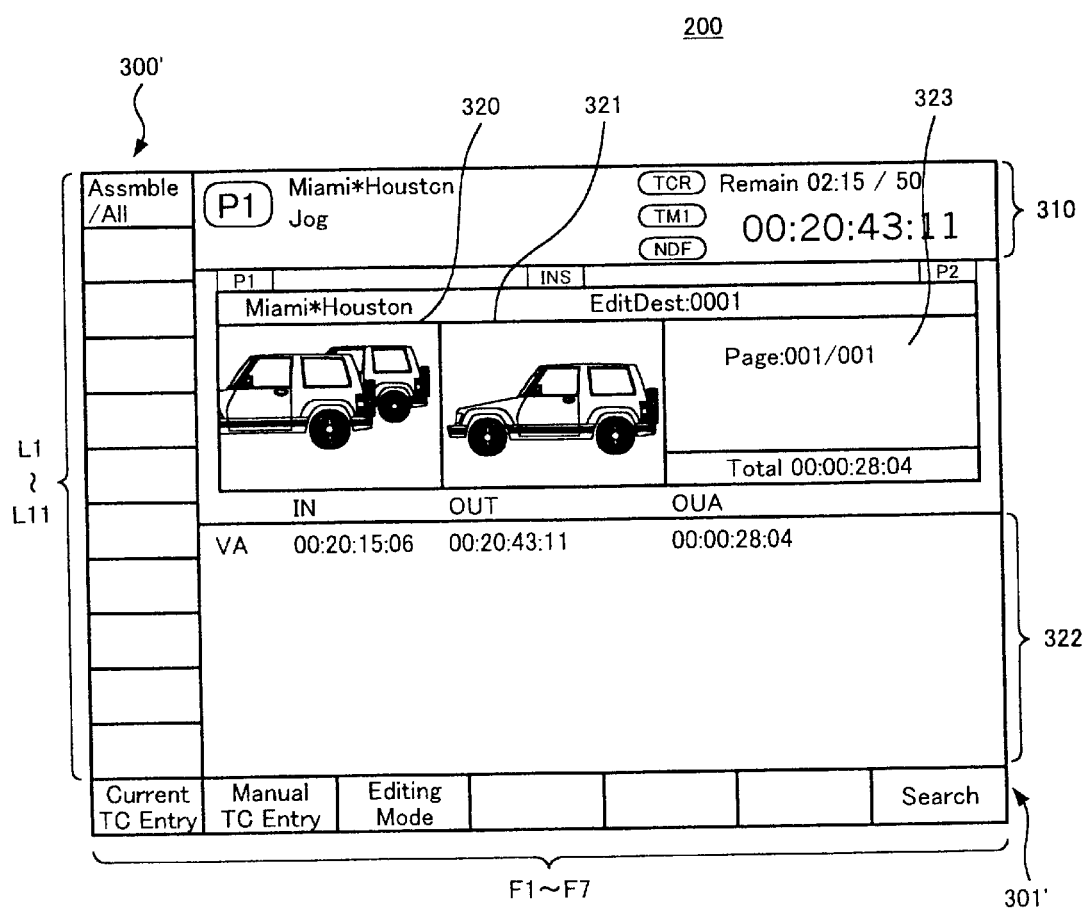
FIG. 15 is a schematic diagram showing another example of information displayed on the displaying portion.

FIGS. 13, 14, and 15 show examples of the displaying portion 200 that display file list information, a moving picture, and a stamp picture that are obtained in the above-described methods. FIG. 13 is an example showing a stamp picture of a file selected corresponding to file list information. This is an example of a display screen in the material mode.

The displaying portion 200 displays a menu 300 at a left edge position thereof. The menu 300 represents functions corresponds to the soft keys L1 to L11. The display portion 200 displays a menu 301 at a lower edge position thereof. The menu 301 represents functions corresponding to the soft keys F1 to F7. An upper portion of the displaying portion 200 is a port information display area 310 for displaying information of a port selected by the port selection switch 22. The CPUs 80A to 80D of the ports 60A to 60D always monitor the states of the respective ports and supply information that represents the port states to the control panel 4 through the CPU bus 30B and the interface 42.

Almost the lower half portion of the displaying portion 200 is a file list display area 302. The file list display area 302 represents a list of material numbers, file names, and file update date/time. When a file name is selected, it is highlighted. When the dial 204 of the control panel 4 is rotated, a selective file can be successively varied. When the soft key L2 corresponding to function "Name" at the second position of the menu 300 is pressed, the file name of the selected file can be changed.

In addition, a stamp picture of the selected file is displayed in the display area 303. File information of the file is represented in the display area 304. Corresponding to the operation of the dial 204, a control command is supplied from the interface 114 to the sub CPU 108. The control command is supplied from the sub CPU 108 to the main CPU 100 through the DPRAM 103. The main CPU 100 reads a stamp picture corresponding to a material number of a selected file from the NAND flash memory 116. The stamp picture that has been read from the NAND flash memory 116 is supplied to the DPRAM 103. The stamp picture stored in the DPRAM 103 is written to an address of the LCD RAM 105 corresponding to the display area of the stamp picture by the sub CPU 108. The data stored in the LCD RAM 105 is read by the LCD controller 104 and then displayed on the LCD 113 through the LCD I/F 112.

In the example that a stamp picture corresponding to the file list display area 302 is displayed in the display area 303, the display area 303 and the port information display information area 310 are clearly separated.

FIG. 14 shows an example of which a moving picture 306 is displayed as a monitor output DM instead of the stamp picture in the display area 303 (hereinafter, a stamp picture displayed in the display area 303 may be referred to as stamp picture 303). For example, a picture photographed by a video camera connected to the port 60A selected by the port selection switch 22 is displayed as the moving picture 306 in the method for displaying a moving picture (2). In the example of which the moving picture 306 is displayed, unlike with the example of which the stamp picture 303 is displayed, assuming that the port information display area 310 is associated with the moving picture 306, they are combined with a display area 307.

In the examples shown in FIGS. 13 and 14, when the stamp picture 303 and the moving picture 306 are not required, the file list display area 302 may be enlarged, causing the stamp picture 303 and the moving picture 306 to disappear. This operation may be performed with the soft key F7 (corresponding to function "Select Active") of the menu 301.

FIG. 15 shows an edit screen in the edit mode. In this example, the case that an IN point and an OUT point are designated will be described. In the states shown in FIG. 13 or 14, when for example the edit switch 203 is pressed, a selected file can be edited. In the example shown in FIG. 15, an IN point picture display area 320 and an OUT point picture display area 321 are disposed. In this case, the menu 300 corresponding to the soft keys L1 to L11 and L1 to F7 shown in FIGS. 13 and 14 is changed to menus 300' and 301'. With the menus 300' and 301', functions different from those in the material mode can be used.

In the example shown in FIG. 15, an IN point and an OUT point have been designated. However, when they have not been designated, a reproduced picture of a selected file is displayed as a moving picture in the IN point picture display area 320. In this case, no picture is displayed in the OUT point picture display area 321. While observing the moving picture in the display area 320, the operator designates an IN point corresponding to the method for displaying still pictures and moving pictures (4) for an IN point and an OUT point in the editing operation. After the IN point has been designated, a moving picture captured for the IN point is read from the flash memory 116 and displayed in the display area 320.

In addition, a reproduced picture is displayed as a moving picture in the display area 321. In the same manner as the IN point, while observing the moving picture in the display area 321, the operator designates an OUT point. Thus, a moving picture captured for the OUT point is displayed in the display area 321.

The display area 322 displays information of the designated IN point and OUT point. The display area 323 displays predetermined edit information such as a page number.

In the example shown in FIG. 15, the case that only an IN point and an OUT point are designated was described. However, it should be noted that the present invention is not limited to such an example. In other words, all pictures that are output as a monitor output DM can be displayed on the displaying portion 200. Thus, a picture edited by the special effect portion 39 can be displayed on the displaying screen 200.

As described above, according to the present invention, the control panel for operating the data recoding and reproducing apparatus has displaying portions that display a monitor picture and operation states of the individual ports. Thus, without need to use an extra monitor, the operator can observe pictures that are being recorded and/or reproduced on the individual ports and edit and manage files stored on a record medium.

In addition, since the operator can monitor and edit files with the data recording and reproducing apparatus, the portability thereof is high. Thus, since the data recording and reproducing apparatus can be used in a limited space, it can be used outdoors or in a mobile broadcasting vehicle.

In addition, since the controller portion that controls the data recording and reproducing apparatus has displaying portions that display a monitor picture and so forth, it is not necessary for the operator to frequently turn his/her eyes. Thus, the operability of the data recording and reproducing apparatus improves.

In addition, according to the embodiment of the present invention, since all the displaying portion can be used for data display instead of a monitor picture and/or a stamp picture, the operability of the data recording and reproducing apparatus improves.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data recording and reproducing apparatus having recording and reproducing means for recording and reproducing data containing video data and/or audio data to and from a record medium that is non-linearly accessible and a plurality of input and output processing means for accessing the recording and reproducing means in respectively assigned time slot periods, outputting the data that is output from the outside to the recording and reproducing means, and inputting the data from the recording and reproducing means, the apparatus comprising:

operating means for performing at least a record operation for causing the data to be recorded to the record medium and a reproduction operation for causing the data to be reproduced from the record medium; the operating means generating free space list information including a link address, a start position, and a blank area length for each blank area on the record medium that is available for data to be recorded onto; and a removable control panel for controlling the operating means and having displaying means for displaying the data that is input to and that is output from said plurality of input and output means, wherein said operating means and said displaying means are integrally structured.

2. A data recording and reproducing apparatus having recording and reproducing means for recording and reproducing data containing video data and/or audio data to and from a record medium that is non-linearly accessible and a plurality of input and output processing means for accessing the recording and reproducing means in respectively assigned time slot periods, outputting the data that is output from the outside to the recording and reproducing means, and inputting the data from the recording and reproducing means, the apparatus comprising:

operating means for performing at least a record operation for causing the data to be recorded to the record medium and a reproduction operation for causing the data to be reproduced from the record medium; the operating means generating free space list information including a link address, a start position, and a blank area length for each blank area on the record medium that is available for data to be recorded onto;

data storing means for temporarily storing the data recorded in the record medium; and a removable control panel for controlling the operating means and having displaying means for displaying the data stored in said data storing means, wherein said operating means and said displaying means are integrally structured.

3. The data recording and reproducing apparatus as set forth in claim 2, wherein said data storing means temporarily stores a plurality of channels of the data, and wherein said displaying means selectively displays one of the plurality of channels of the data stored in said storing means.

4. The data recording and reproducing apparatus as set forth in claim 2, wherein said data storing means temporarily stores information that represents the write start position of the record medium for the data.

5. The data recording and reproducing apparatus as set forth in claim 2, wherein said data storing means temporarily stores information that represents the write end position of the record medium for the data.

6. A data recording and reproducing apparatus having recording and reproducing means for recording and reproducing data containing video data and/or audio data to and from a record medium that is non-linearly accessible and a plurality of input and output processing means for accessing the recording and reproducing means in respectively assigned time slot periods, outputting the data that is output from the outside to the recording and reproducing means, and inputting the data from the recording and reproducing means, the apparatus comprising:

operating means for performing at least a record operation for causing the data to be recorded to the record medium and a reproduction operation for causing the data to be reproduced from the record medium so as to edit the data; the operating means generating free space list information including a link address, a start position, and a blank area length for each blank area on the record medium that is available for data to be recorded onto;

data storing means for temporarily storing the data recorded in the record medium when the data is edited by a predetermined operation performed by said operating means; and a removable control panel for controlling the operating means and having displaying means for displaying the data stored in said data storing means, wherein said operating means and said displaying means are integrally structured.

7. The data recording and reproducing apparatus as set forth in claim 6, wherein said data storing means temporarily stores information that represents the edit start position of the data and information that represents the edit end position of the data, and wherein said data displaying means displays both the information that represents the edit start position and the information that represents the edit end position.

8. A data displaying method for a data recording and reproducing apparatus for outputting data containing video data and/or audio data that is supplied from the outside to a record medium that is non-linearly accessible in an assigned time slot period and for outputting the data from the record medium in an assigned time slot period, the method comprising the steps of:

(a) performing at least a record operation for causing the data to be recorded to the record medium and a reproduction operation for causing the data to be reproduced from the record medium corresponding to an operation of operating means;

(b) displaying the data on displaying means of a removable control panel integrally structured with the operating means corresponding to an operation performed at step (a); and (c) generating free space list information including a link address, a start position and a blank area length for each blank area on the record medium that is available for data to be recorded onto.

9. A data displaying method for a data recording and reproducing apparatus for outputting data containing video data and/or audio data that is supplied from the outside to a record medium that is non-linearly accessible in an assigned time slot period and for outputting the data from the record medium in an assigned time slot period, the method comprising the steps of:

(a) performing at least a record operation for causing the data to be recorded to the record medium and a reproduction operation for causing the data to be reproduced from the record medium corresponding to an operation of operating means;

(b) temporarily storing the data reproduced from the record medium corresponding to the reproduction operation performed at step (a);

(c) displaying the data temporarily stored at step (b) on displaying means of a removable control panel integrally structured with the operating means; and (d) generating free space list information including a link address, a start position, and a blank area length for each blank area on the record medium that is available for data to be recorded onto.

10. The data displaying method as set forth in claim 9, wherein step (b) is performed by temporarily storing a plurality of channels of the data, and wherein step (c) is performed by selectively displaying the plurality of channels of the data.

11. The data displaying method as set forth in claim 9, wherein step (b) is performed by temporarily storing information that represents the write start position of the record medium for the data.

12. The data displaying method as set forth in claim 9, wherein step (b) is performed by temporarily storing information that represents the write end position of the record medium for the data.

13. A data displaying method for a data recording and reproducing apparatus for outputting data containing video data and/or audio data that is supplied from the outside to a record medium that is non-linearly accessible in an assigned time slot period and for outputting the data from the record medium in an assigned time slot period, the method comprising the steps of:

(a) performing at least a record operation for causing the data to be recorded to the record medium and a reproduction operation for causing the data to be reproduced from the record medium corresponding to an operation of operating means so as to edit the data;

(b) temporarily storing the data recorded in the record medium when the data is edited by a predetermined operation performed at step (a);

(c) displaying the data temporarily stored at step (b) on displaying means of a removable control panel integrally structured with the operating means; and (d) generating free space list information including a link address, a start position, and a blank area length for each blank area on the record medium that is available for data to be recorded onto.

14. The data displaying method as set forth in claim 13, wherein step (b) is performed by temporarily storing information that represents the edit start position and information that represents the edit end position, and wherein step (c) is performed by displaying both the information that represents the edit start position and the information that represents the edit end position on the displaying means.

* * * * *